(12) United States Patent
Terrien et al.

(10) Patent No.: US 6,277,287 B1
(45) Date of Patent: Aug. 21, 2001

(54) SELF LEVELING SUCTION SKIMMING DEVICE

(75) Inventors: Richard J. Terrien, Madison, WI (US); David T. Walker, Streator, IL (US)

(73) Assignee: Universal Separations, Inc., Madison, WI (US)

(*) Notice: Subject to any disclaimer, the term of this patent is extended or adjusted under 35 U.S.C. 154(b) by 0 days.

(21) Appl. No.: 09/640,413

(22) Filed: Aug. 17, 2000

Related U.S. Application Data

(63) Continuation of application No. 09/226,331, filed on Jan. 6, 1999, now Pat. No. 6,183,654.

(51) Int. Cl.[7] .................. C02F 1/40; E02B 15/10
(52) U.S. Cl. .............. 210/747; 210/776; 210/170; 210/232; 210/242.3; 210/923; 137/398
(58) Field of Search ................... 210/121, 169, 210/170, 232, 242.1, 242.3, 416.1, 776, 416.2, 747, 922, 923; 137/386, 398

(56) References Cited

U.S. PATENT DOCUMENTS

| | | | |
|---|---|---|---|
| 1,107,391 | * | 8/1914 | Welch . |
| 2,010,363 | * | 8/1935 | Hine . |
| 2,579,304 | * | 12/1951 | Crawford . |
| 3,693,800 | * | 9/1972 | Stanfield et al. . |
| 3,707,232 | * | 12/1972 | Harrington et al. . |
| 3,727,765 | * | 4/1973 | Henning, Jr. et al. . |
| 3,745,115 | * | 7/1973 | Olsen . |
| 4,301,008 | * | 11/1981 | Baffert et al. . |
| 4,663,037 | * | 5/1987 | Breslin . |
| 5,118,412 | * | 6/1992 | Schmidt . |
| 5,451,330 | | 9/1995 | Garrett .................. 210/776 |
| 5,601,705 | * | 2/1997 | Glasgow . |
| 5,772,871 | * | 6/1998 | Lyon et al. . |
| 5,814,213 | | 9/1998 | Glasgow .................. 210/104 |
| 5,897,773 | * | 4/1999 | Rhodes . |
| 5,989,414 | * | 11/1999 | Bzorgi . |
| 6,027,641 | * | 2/2000 | Spradbury et al. . |
| 6,159,362 | * | 12/2000 | Gilmore . |
| 6,183,654 | * | 2/2001 | Terrien et al. . |

FOREIGN PATENT DOCUMENTS

| | | | |
|---|---|---|---|
| 2560903 | * | 9/1985 | (FR) . |
| 2560903 | | 3/1994 | (FR) . |

\* cited by examiner

*Primary Examiner*—David A. Simmons
*Assistant Examiner*—Fred Prince
(74) *Attorney, Agent, or Firm*—Medlen & Carroll, LLP

(57) ABSTRACT

A suction skimmer with a vertically adjustable inlet for removing preferred upper portions of a liquid from a fluid body under substantially laminar flow conditions and which is self leveling in response to level changes in a fluid body. Suction skimming device includes a skimming sleeve elongated body member having a fluid flow passageway disposed proximally contiguous and slidably movable along the vertical axis of an elongated body sleeve guide member having a fluid flow passageway. The fluid flow passageway of the skimming sleeve member is in open communication with the fluid flow passageway of the sleeve guide member. The suction skimmer is provided with a flotation assembly to buoyantly support the skimming sleeve member thereby positioning the inlet first end of the skimming sleeve member near the surface of a fluid body. The flotation assembly is removably engaged to the skimming sleeve member so that the distance between the skimming sleeve inlet and the surface of a fluid body can be preferentially adjusted and engaged over a large array of vertical distances.

28 Claims, 3 Drawing Sheets

SELF LEVELING SUCTION SKIMMING DEVICE

This application is a continuation of application Ser. No. 09/226,331, filed Jan. 6, 1999 now U.S. Pat. No. 6,183,654.

BACKGROUND

1. Field of the Invention

This present invention relates generally to suction skimmer systems and, more particularly, but not by way of limitation, to a self leveling suction skimmer which can be adjustably engaged at preferred distances from the surface of a fluid body to separate preferred upper layers of liquid from a carrying layer of liquid in a fluid composition of immiscible liquids.

2. Description of Prior Art

Liquid mixtures produced by various industrial or natural processes frequently contain substances of differing specific gravity which separate by specific gravity into layers within the body of liquid. Skimming devices can be used to separate liquids of lighter specific gravity such as in oil-water mixtures into two components, one having molecules of substantially lighter specific gravity, while the other contains molecules of a substantially heavier specific gravity.

Suction skimmers have been deployed to remove the topmost layers of fluids from these liquid mixtures. In U.S. Pat. No. 5,451,330 by Gary C. Garrett a suction skimming device is described which requires manual adjustment to change skim positions in response to level changes in the liquid body. This device skims from only two preferred directions using fixed slot positions and also can not be configured to substantially exclude the topmost fluid layers from the skimmed fluids.

U.S. Pat. No. 5,601,705 and U.S. Pat. No. 5,814,213 by James A. Glasgow include a floating suction skimmer but this construction requires a complex mechanical sensor which is subject to mechanical failure and failure of operation due to the presence of grit and contaminants in the skimmed fluids.

From the foregoing, no previous suction skimmer apparatus is self leveling for variable levels in the fluid body, skims adjustably preferred layers near the surface of a fluid body, provides a highly accurate and simple to operate method for setting and controlling variable preferred skim depths near a fluid surface, or which can operate without failure in the presence of grit and contaminants in the skimmed fluids.

OBJECTS AND ADVANTAGES

Accordingly, several objects and advantages of the present invention are offered:

(a) to provide an object which can skim fluids near the surface of a fluid body which is self leveling in response to level changes in the fluid body.

(b) to provide an object which can skim fluids near the surface of a fluid body which can be easily adjusted so as to skim at preferred variable distances from the surface of a fluid body.

(c) to provide an object which can skim fluids near the surface of a fluid body whose skimming inlet can be adjustably disposed and engaged over a large array of preferred distances from the surface of a fluid body.

(d) to provide an object which can skim fluids at preferred distances from the surface of a fluid body which is simple to operate and maintain.

(e) to provide an object which can skim fluids near the surface of a fluid body which can operate without the need for sensors or mechanical linkages.

(f) to provide an object which can skim fluids near the surface of a fluid body which can operate without interruption due to the presence of physical contaminants such as grit in the skimmed fluids.

(g) to provide an object which can skim fluids near the surface of a fluid body which can be adjusted and operated so as to substantially exclude the topmost layer of a fluid body from entering the flow of skimmed fluids.

Further objects and advantages of our invention will become apparent from a consideration of the drawings and ensuing description.

GENERAL DESCRIPTION

Figure 1:
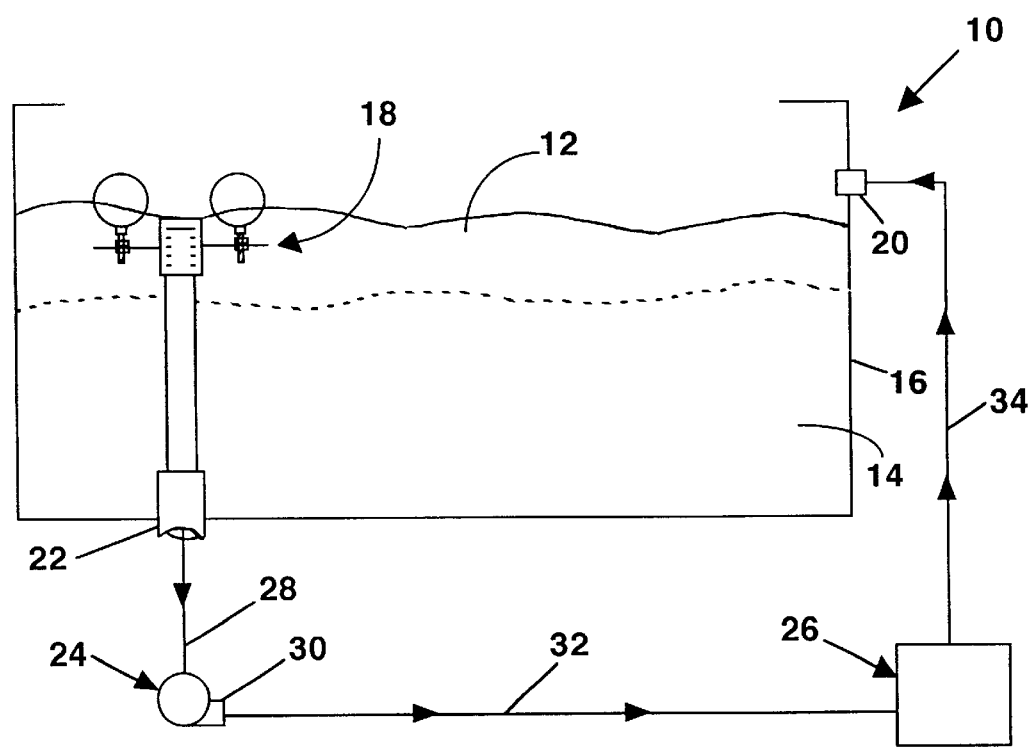
FIG. 1 is a diagrammatic view of a skimmer system utilizing a suction skimmer constructed in accordance with the present invention.
Figure 2:
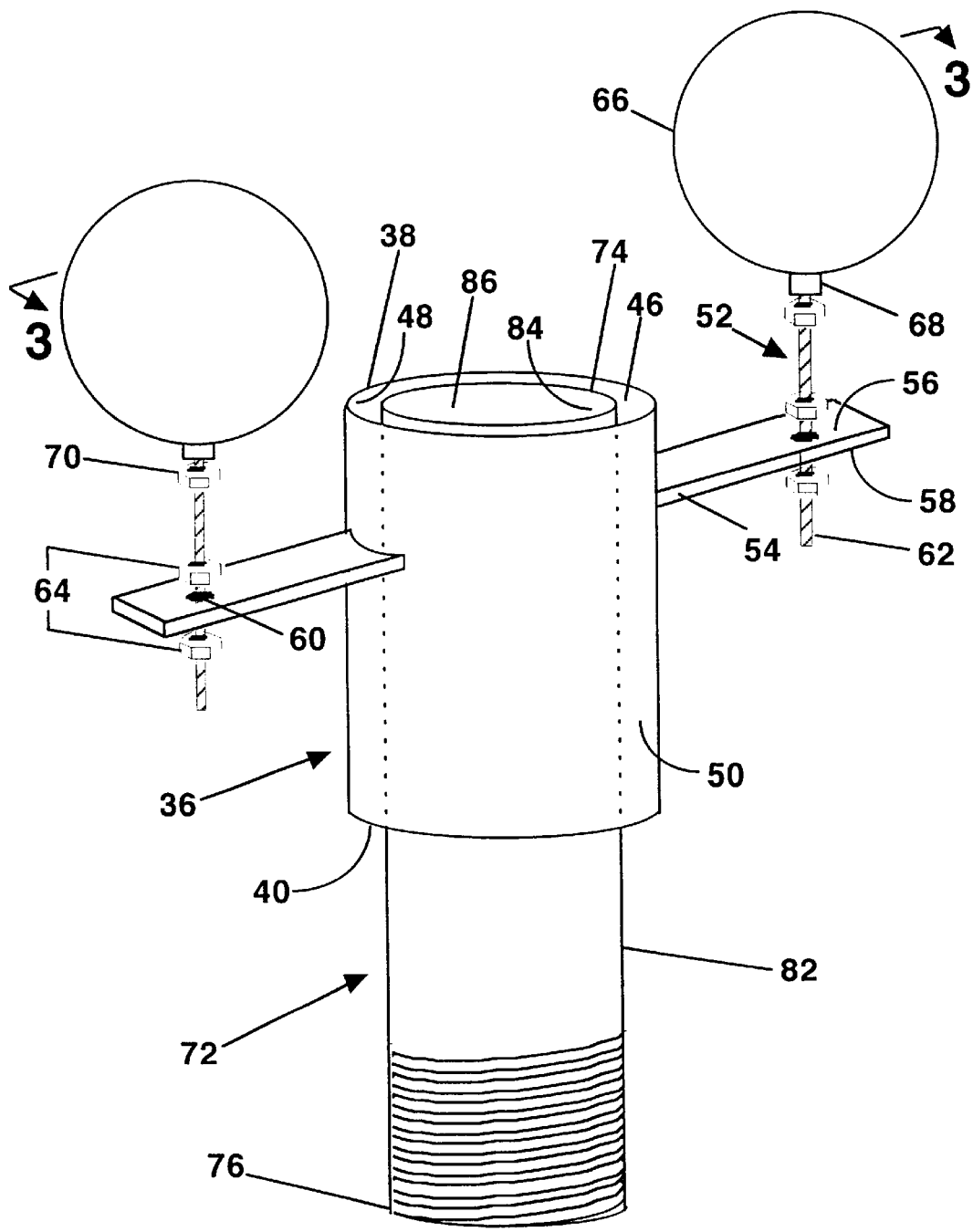
FIG. 2 is a perspective view of the suction skimmer of the present invention.

The present invention provides a suction skimmer for removing an upper layer of liquid from a fluid body, comprising an elongated skimming sleeve body member having an inlet, an outlet, and a fluid flow passageway in open communication with the inlet and the outlet, a flotation means removably engaged to the skimming sleeve body member, a means for removably engaging and adjusting the vertical distance between the inlet of the skimming sleeve body member and the surface of a fluid body, and means for guiding the skimming sleeve body member to provide substantially vertical orientation for the body member and disposed to provide substantially laminar flow of liquid through the fluid flow passageway of the skimming sleeve body member into a fluid flow passageway of the guiding means; preferably, the guiding means is a sleeve guide member having an inlet, and outlet, and a fluid flow passageway in open communication with the inlet and the outlet. In one embodiment, the skimming sleeve body member is disposed on the sleeve guide means such that the inner peripheral surface of the skimming sleeve member is slidably movable along the outer peripheral surface of the sleeve guide means. In an alternative embodiment, the sleeve guide means is disposed on the skimming sleeve body member such that the outer peripheral surface of the skimming sleeve body member is slidably movable along the inner peripheral surface of the sleeve guide means.

In another embodiment, the flotation means are buoyant float members with a means for attaching to the skimming sleeve body member. Preferably, the flotation means are a plurality of float balls suitably round or cylindrical in shape to prevent the accumulation of debris on their surfaces.

In yet another embodiment, the means of removably engaging and adjusting the vertical distance between the inlet of the skimming sleeve body member and the surface of a fluid body are vertically disposed rods with means for removably engageable attachment. In one aspect, the rods are threaded rods, and the means for removably engageable attachment are positioning jam nuts. Preferably, one of the threaded jam nuts is permanently affixed as by welding, thereby requiring a single positioning jam nut to be manipulated so as to adjustably engage threaded rod. In yet another embodiment, the means of adjusting the vertical position of the flotation means are non-threaded rods and set screws.

In another aspect, the means for guiding skimming sleeve body member to provide vertical orientation for the body member and disposed to provide substantially laminar flow of liquid through the fluid flow passageway of the skimming sleeve member into the fluid flow passageway of the sleeve guide member is a conduit. In one aspect, the conduit is a pipe, threaded at the second end to provide a threadably engaged connection to a second conduit for the transmission of skimmed fluids to a pump.

In yet another aspect, the invention provides a suction skimmer for removing an upper layer of liquid from a fluid body as described above whereby the skimming sleeve body member is adjustably disposed to substantially exclude the topmost layers of the fluid body by positioning the inlet first end of the skimming sleeve member above the surface of the fluid body, and positioning the submerged second end of the skimming sleeve body member as the skimmer inlet.

In yet another aspect, the invention provides a suction skimmer for removing an upper layer of liquid from a fluid body as described above whereby the skimming sleeve body member is provided with a restraining means to limit the vertical movement of the skimming sleeve member to a maximum distance equal to the length of the elongated body of skimming sleeve body member.

The present invention also provides a method for separating a non-emulsified oil layer from an aqueous layer in a vessel for discharge from the vessel via a fluid outlet of the vessel, the method comprising: providing a skimmer comprising a skimming sleeve body member having a first end, a second end, and a fluid flow passageway extending through at least a portion of the body member in open communication with the second end of the body member, a flotation means adjustably engaged to the skimming sleeve body member, a means of adjusting and affixing the vertical position of the inlet of the skimming sleeve body member relative to the flotation means, and a means for guiding the skimming sleeve body member to provide substantially vertical orientation for the body member and disposed to provide substantially laminar flow of liquid through the fluid flow passageway of the skimming sleeve member into the fluid flow passageway of the guiding means, where the guiding means is preferably a sleeve guide member; connecting the second end of the sleeve guide body member to the vessel such that the fluid flow passageway of the sleeve guide body member is in fluid communication with the outlet of the vessel and the first end of the sleeve guide member and disposing the skimming sleeve body member on the sleeve guide member to be slidably movably such that the inner peripheral surface of the skimming sleeve member is slidably movable along the outer peripheral surface of the sleeve guide member; withdrawing non-emulsified oil from the vessel by passing the non-emulsified oil through the inlet first end of the skimming sleeve body member and through the fluid flow passageway of the skimming sleeve member and through the fluid flow passageway of the sleeve guide member and the outlet of the vessel; and adjusting the flotation assembly, engaged with the skimming sleeve body member, to provide a preferred distance between the inlet first end of the skimming sleeve member and the surface of the fluid body so to provide substantially laminar flow of non-emulsified oil from the preferred upper layer of the fluid body into the inlet first end of the skimming sleeve member.

The present invention also provides a method for separating preferred layers in a fluid body so as to substantially exclude the topmost layer of the fluid body from entering the flow of fluids skimmed from a vessel for discharge from the vessel via a fluid outlet of the vessel, the method comprising: providing a skimmer comprising a skimming sleeve body member having a first end, a second end, and a fluid flow passageway extending through at least a portion of the body member in open communication with the second end of the body member, a flotation means adjustably engaged to the skimming sleeve body member, a means of adjusting and affixing the vertical position of the inlet of the skimming sleeve body member relative to the flotation means and a means for guiding skimming sleeve body member to provide substantially vertical orientation for the body member and disposed to provide substantially laminar flow of liquid through the fluid flow passageway of the skimming sleeve member into the fluid flow passageway of the sleeve guide member; connecting the second end of the sleeve guide body member to the vessel such that the fluid flow passageway of the sleeve guide body member is in fluid communication with the outlet of the vessel and the first end of the sleeve guide body member and disposing the skimming sleeve member on the sleeve guide body member to be slidably movably such that the inner peripheral surface of the skimming sleeve member is slidably movable along the outer peripheral surface of the sleeve guide member; withdrawing preferred layers of the fluid body, substantially excluding the topmost layer from the vessel by passing the preferred layers through the second end of the skimming sleeve member and through the fluid flow passageway of the skimming sleeve member and through the fluid flow passageway of the sleeve guide member and the outlet of the vessel; and adjusting the flotation assembly, engaged with the skimming sleeve member to provide a distance between the inlet first end of the skimming sleeve member and the surface of the fluid body such that the inlet first end is disposed above the surface of the fluid body to substantially exclude the topmost upper layer of the fluid body from entering into the fluid flow passageway of the skimming sleeve member and the fluid flow passageway of the sleeve guide body member.

Reference Numerals in Drawings

10 Fluid Processing System
12 Upper layer fluid body
14 Fluid body
16 Vessel
18 Suction skimmer
20 Vessel fluid inlet
22 Vessel fluid outlet
24 Pump
26 Effluent separation or purification system
28 Conduit
30 Pump discharge port
32 Conduit
34 Conduit
36 Skimming sleeve elongated body member
38 First end, skimming sleeve
40 Second end, skimming sleeve
42 Inside diameter, skimming sleeve
44 Outside diameter, skimming sleeve
46 Fluid flow passageway, skimming sleeve
48 Inner peripheral surface, skimming sleeve
50 Outer peripheral surface, skimming sleeve
52 Flotation assembly
54 Support bracket members
56 First side, support bracket member
58 Second side, support bracket member
60 Open aperture, support bracket member 62 Threaded rods
64 Positioning jam nuts
66 Buoyant flotation members
68 Internally threaded connectors
70 Locking jam nuts
72 Sleeve guide member
74 First end, sleeve guide member
76 Second end, sleeve guide member
78 Outside diameter, sleeve guide member
80 Inside diameter, sleeve guide member
82 Outer peripheral surface, sleeve guide member
84 Inner peripheral surface, sleeve guide member
86 Fluid passageway, sleeve guide member

DESCRIPTION OF THE PREFERRED EMBODIMENTS

The present invention is adapted for separating immiscible liquids such as oil and water. It may be used for removing spilled oil from bays, rivers, and lakes, etc. or may also be used in a tank or vessel as shown in FIG. 1

Shown in FIG. 1 is a fluid processing system 10 for selectively withdrawing a preferred upper layer or portion 12 of a fluid body 14 from a vessel 16 which includes a self leveling suction skimmer 18 constructed and operated in accordance with the present invention. The vessel 16 is provided with a fluid inlet 20 and a fluid outlet 22. The processing system 10 further includes a pump 24 and an effluent separation or purification system 26.

The suction skimmer 18 is disposed within vessel 16 substantially as shown and can be connected directly or by a standard pipe coupling (not shown) to the fluid outlet 22 so that fluid communication is established therebetween. The fluid outlet 22 is also connected to the suction port (not shown) of the pump 24 via conduit 28 and the discharge port 30 of the pump 24 is connected to the effluent separation or purification system 26 via conduit 32. The effluent separation or purification system 26 is then connected to the fluid inlet 20 of the vessel 16 via conduit 34.

When the fluid body 14 becomes contaminated with hydrocarbon, non-emulsified oils, soils, and or grit such as metal particles, the pump 24 is actuated so that the upper layer 12 of the fluid body 14 is withdrawn from the vessel 16 under substantially laminar flow conditions via the suction skimmer 18 and passed to the effluent separation or purification system 26 via the fluid outlet 22 of the vessel 16, the conduit 28, the pump 24 and the conduit 32. After the contaminants have been removed from the fluid body 14 by the effluent separation or purification system 26, the treated liquid, substantially free of contaminants, is passed to the vessel 16 via the conduit 34 and the fluid inlet 20 of the vessel 16.

The fluid body 14 can be an aqueous solution containing a surfactant such as is used in parts washers, or a lubricant such as is used in a milling or drilling machine. Thus the nature and type of effluent separation or purification system employed will be dependent upon the nature of the fluid body 14 in the vessel 16, as well as the contaminants in the liquid.

As will be described in more detail hereinafter, the design and operation of the suction skimmer 18 permits the upper layer 12 of the fluid body 14 contained in the vessel 16 to be removed at adjustably preferred distances from the surface of the fluid body 14 under substantially laminar flow conditions while self leveling in response to changes in the fluid level of vessel 16.

Figure 3:
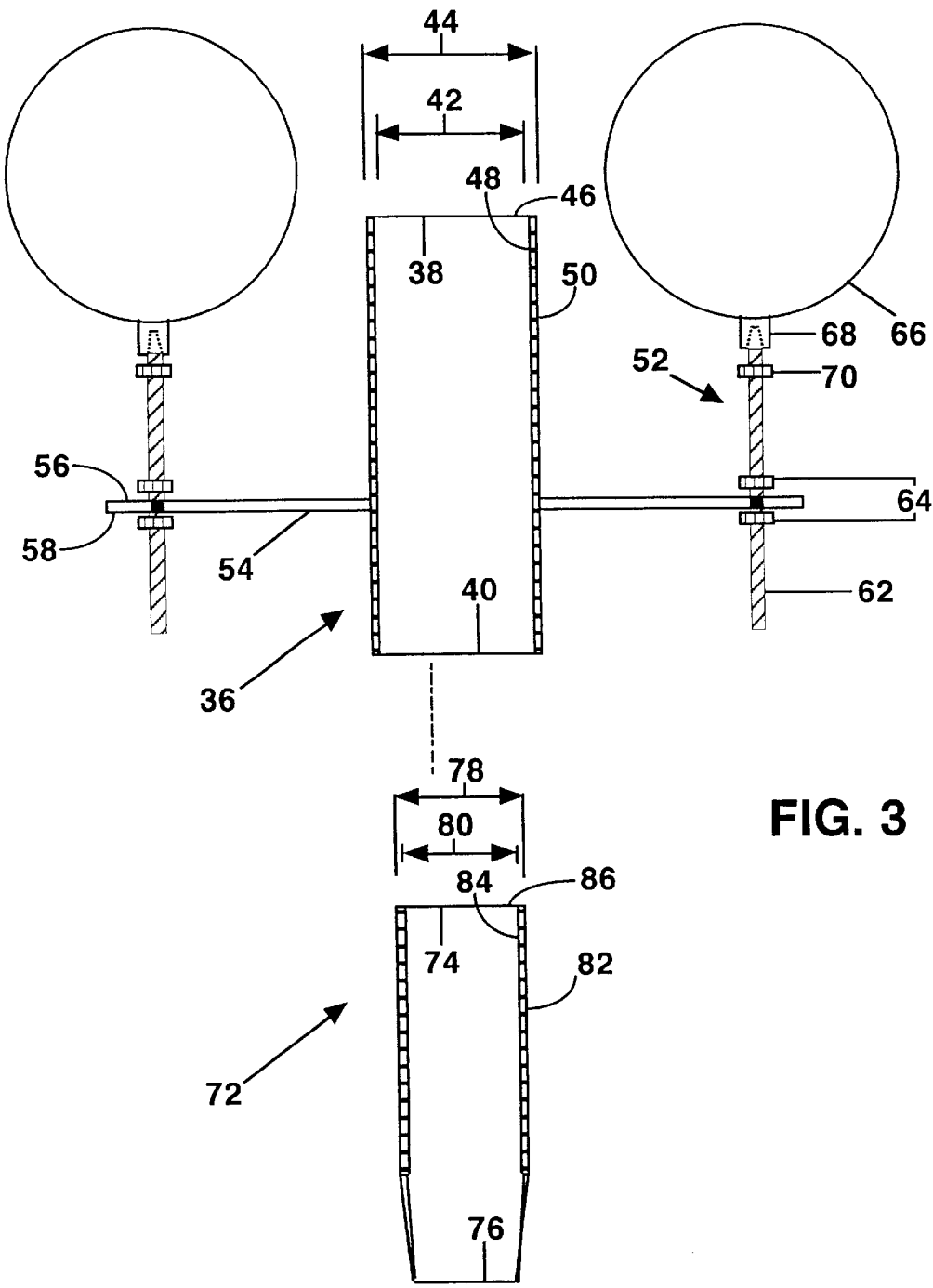
FIG. 3 is a cross sectional view of the suction skimmer taken at lines 3—3 of FIG. 2.

The suction skimmer 18 includes an elongated body skimming sleeve member 36 having a first end 38, a second end 40, an inside diameter 42 (FIG. 3), an outside diameter 44, a fluid flow passageway 46 extending therebetween, an inner 6 peripheral surface 48 and an outer peripheral surface 50.

The suction skimmer 18 further includes a flotation assembly 52 for buoyantly supporting and removably engaging the skimming sleeve member 36. The first end 38 of the skimming sleeve member 36 comprises the suction skimmer inlet. The flotation assembly 52 comprises a means for removably engaging and adjusting preferred distances between the first end 38 of the skimming sleeve member 36 and the surface of the upper layer 12 of fluid body 14 in vessel 16.

The flotation assembly 52 is provided with support bracket members 54 in the form of elongated plates which can be attached by welding to the elongated body of the skimming sleeve member 36 in a perpendicular alignment with the skimming sleeve member 36. Support bracket members 54 are circumfrencially spaced approximately 90 degrees in apposition on the skimming sleeve member 36. The support bracket members 54 are provided with a first side 56 and a second side 58. The support bracket members 54 are provided with an open aperture 60 between the first side 56 of the support bracket member 54 and the second side 58 of the support bracket 54.

The flotation assembly 52 is further provided with threaded rods 62 disposed through the open apertures 60 of the support bracket members 54. The threaded rods 62 are provided with positioning jam nuts 64 located at the first side 56 and the second side 58 of the support bracket members 54 for removably engaging the threaded rods 62 at preferred variable positions.

The flotation assembly 52 is further provided with buoyant flotation members 66 which can have attached internally threaded connectors 68. The flotation members 66 are suitably round or cylindrical in shape to prevent debris from accumulating on the surfaces thereof. Internally threaded connectors 68 are attached to threaded rods 62 to create removable connections between the flotation members 66 and the threaded rods 62. Locking jam nuts 70 are provided to removably affix internally threaded connectors 68 of flotation members 66 to threaded rods 62. Positioning jam nuts 64 are provided to removably engage threaded rods 62 engaged with flotation members 66 to support bracket members 54. The inlet first end 38 of elongated body skimming sleeve member 36 engaged to support bracket members 54 can be adjustably positioned at variable preferred distances from the surface of the fluid body 16 by increasing or decreasing the distance between flotation members 66 and support bracket members 54.

Increasing the distance between flotation members 66 and support bracket members 54, in direct connection with the skimming sleeve elongated body member 36 having an inlet at first end 38, causes an increase in the distance from the surface of the upper fluid layer 12 of the fluid body 14 to the inlet first end 38. Decreasing the distance between flotation members 66 and support bracket members 54, in direct connection with the skimming sleeve elongated body member 36 having an inlet at first end 38, causes a decrease in the distance from the surface of the upper fluid layer 12 of the fluid body 14 to the inlet first end 38.

The suction skimmer 18 further includes a sleeve guide member 72 having a first end 74, and a second end 76. The sleeve guide member 72 is further provided with an outside diameter 78, an inside diameter 80, an outer peripheral surface 82 and an inner peripheral surface 84. The sleeve guide member is further provided with a fluid passageway 86. The outside diameter 78 of the sleeve guide member 72 is less than the inside diameter 42 of the skimming sleeve member 36. The sleeve guide member 72 is vertically positioned so as to provide substantially vertical alignment for the skimming sleeve elongated body member 36.

The first end 74 of the sleeve guide member 72 is slidably positioned in the fluid flow passageway 46 of the skimming sleeve member 36 so that the inner peripheral surface 48 of skimming sleeve member 36 is disposed about the outer peripheral surface 82 of the sleeve guide member 72. Fluid communication under substantially vertical flow conditions is established between the fluid passageway 46 of the skimming sleeve member 36 and the fluid passageway 86 of the sleeve guide member 72.

The second end of the sleeve guide member 76 is connected to the vessel fluid outlet 22 of the vessel 16 by any conventional means as long as a fluid tight connection is formed between the second end 76 of the sleeve guide member 72 and the vessel fluid outlet 22, while maintaining fluid communication between the fluid flow passageway 86 of the sleeve guide member 72 and the fluid outlet 22 of the vessel 16. For example, the second end 76 of the sleeve guide member 72 may be provided with externally disposed threads which are adapted to matingly engage internally disposed threads (not shown) in the vessel fluid outlet 22 or standard threaded couplings as needed (not shown) to form a fluid tight connection.

Skimmed fluids from a preferred upper layer 12 of fluid body 14 enter the suction skimmer 18 at the first end 38 of the skimming sleeve member 36 and are withdrawn from fluid body 14 for processing in an effluent separation or purification system 26.

In one aspect of the present invention the suction skimmer 18 is self-leveling in response to changing levels in the fluid body 14.

In another aspect of the present invention the suction skimmer 18 can be preferably adjusted to efficiently skim fluids from a large array of variable preferred distances from the surface of the upper layer 12 of the fluid body 14.

In another aspect of the present invention the suction skimmer 18 can be preferably adjusted to substantially exclude the topmost fluid layers of the upper layer 12 of the fluid body 14 by adjusting flotation assembly 52 to position first end 38 of skimming sleeve member 36 above the surface of the upper layer 12 of the fluid body 14. In this aspect the inlet to the suction skimmer is the second end 40 of skimming sleeve member 36.

In another aspect of the present invention the suction skimmer 18 can be provided with a restraining means so as to restrict the total movement of the skimming sleeve member 36 to the maximum length of the elongated body of skimming sleeve member 36. This aspect insures that the skimming sleeve member 36 does not become disengaged form the sleeve guide member 72 during high fluid level conditions or surface turbulence.

SUMMARY

In summary, an improved suction skimming apparatus for removing an immiscible fluid from a fluid composition has been described. The suction skimmer 18, as well as the components thereof, can be constructed of any suitable material having sufficient rigidity and which is inert and stable in the environment in which the suction skimmer 18 is used. Other uses and modifications for the present invention will be readily apparent to a person of ordinary skill in the art and all such uses and modifications are intended to fall within the scope of the appended claims.

What is claimed is:

1. A suction skimmer for removing an upper layer of fluid from a fluid body, comprising:
   a. an elongated skimming sleeve body member having an open upper end, an open lower end, and a fluid flow passageway in open communication with the open upper end and the open lower end, where either open end may serve as a fluid inlet from the fluid body;
   b. a flotation assembly engaged to the skimming sleeve body member; and
   c. a means for adjusting a distance between the skimming sleeve body open upper end and a surface of the fluid body, such that the skimming sleeve body member open upper end may be above, at, or below the surface of the fluid body.

2. A suction skimmer according to claim 1, wherein the means for adjusting the distance between the skimming sleeve body open upper end and the surface of the fluid body are also a means for engaging the flotation assembly to the skimming sleeve body member.

3. A suction skimmer according to claim 2, wherein the means for engaging the flotation assembly to the skimming sleeve body member and for adjusting the distance between the skimming sleeve body open upper end and the surface of the fluid body comprises vertically disposed rods removably attached to the floatation assembly and to the skimming sleeve body member.

4. A suction skimmer according to claim 2, wherein the means for engaging the flotation assembly to the skimming sleeve body member and for adjusting the distance between the skimming sleeve body open upper end and the surface of the fluid body comprises non-threaded rods and set screws removably attached to the floatation assembly and to the skimming sleeve body member.

5. A suction skimmer according to claim 2, wherein the means for engaging the flotation assembly to the skimming sleeve body member and for adjusting the distance between the skimming sleeve body open upper end and the surface of the fluid body comprises threaded rods which removably connect the flotation assembly to the skimming sleeve body member.

6. A suction skimmer according to claim 2, wherein the skimming sleeve body member further comprises support bracket members attached to an outer surface of the skimming sleeve body member between the skimming sleeve body member open upper end and the skimming sleeve body member open lower end.

7. A suction skimmer according to claim 6, wherein the flotation assembly comprises buoyant flotation members engaged to the skimming sleeve body member, and further wherein the buoyant members each comprise an integrally threaded connector which is removably attached to one end of a threaded rod by locking jam nuts, and wherein the bracket members each comprise an open aperture through which a threaded rod may be removably attached at an opposite end to the bracket by a positioning jam nut on each surface of the bracket support member.

8. A suction skimmer according to claim 6, wherein the support bracket members are elongated plates attached at a perpendicular angle to the skimming sleeve body.

9. A suction skimmer according to claim 6, wherein the buoyant flotation members are round or cylindrical in shape.

10. A suction skimmer according to claim 1, wherein the skimming sleeve body member is cylindrical in shape.

11. A suction skimmer according to claim 1, further comprising means for providing fluid flow from the skimming sleeve body member.

12. A suction skimmer according to claim 1, further comprising means for orienting the skimming sleeve body member with respect to the surface of the fluid body.

13. A suction skimmer according to claim 11, wherein the means for providing fluid flow from the skimming sleeve body member are also a means for orienting the skimming sleeve body member with respect to the surface of the fluid body.

14. A suction skimmer according to claim 13, wherein the means for orienting the skimming sleeve body member with respect to the surface of the fluid body comprises a sleeve guide member, wherein the sleeve guide member comprises an inlet, an outlet, a fluid flow passageway in open communication with the inlet and the outlet, and an outside diameter which is less than an inside diameter of the skimming sleeve body member, and wherein the sleeve guide member inlet is slidably positioned within the fluid flow passageway of the skimming sleeve body member.

15. A suction skimmer according to claim 14, wherein the sleeve guide member is vertically positioned within the fluid body.

16. A suction skimmer according to claim 14, wherein the sleeve guide member further comprises means for connecting the sleeve guide member to a suction pump.

17. A suction skimmer according to claim 14, wherein the sleeve guide member further comprises means for connecting the sleeve guide member to an outlet of a vessel which contains the fluid.

18. A suction skimmer according to claim 17, wherein the means for connecting the sleeve guide member to an outlet of the vessel which contains the fluid comprises externally disposed threads on the sleeve guide member outlet which are adapted to matingly engage internally disposed threads in the vessel outlet.

19. A suction skimmer according to claim 14, wherein the sleeve guide member is cylindrical in shape.

20. A suction skimmer according to claim 1, wherein the flotation assembly comprises buoyant flotation members, where the buoyant flotation members are round or cylindrical in shape and each comprises an integrally threaded connector which is removably attached to one end of a threaded rod by locking jam nuts, and where the skimming sleeve body member is cylindrical in shape and further comprises support bracket members attached to an outer surface of the skimming sleeve body member between the open upper end and the open lower end, and where the support bracket members each comprise an open aperture through which the threaded rod may be removably attached at an opposite end to the bracket by a positioning jam nut on each surface of the bracket support member.

21. A suction skimmer according to claim 13, wherein the means for orienting the skimming sleeve body member with respect to the surface of the fluid body comprises a sleeve guide member, where the sleeve guide member is cylindrical in shape and comprises an inlet, an outlet, a fluid flow passageway in open communication with the inlet and the outlet, and an outside diameter which is less than an inside diameter of the skimming sleeve body member, and where the sleeve guide member inlet is slidably positioned within the fluid flow passageway of the skimming sleeve body member and vertically positioned within the fluid body, and where the sleeve guide member further comprises means for connecting the sleeve guide member to a suction pump.

22. A suction skimmer according to claim 1, wherein the flotation assembly comprises buoyant flotation members, where the buoyant flotation members are round or cylindrical in shape and each comprises an integrally threaded connector which is removably attached to one end of a threaded rod by locking jam nuts, and where the skimming sleeve body member is cylindrical in shape and further comprises support bracket members attached to an outer surface of the skimming sleeve body member between the open upper end and the open lower end, and where the support bracket members each comprise an open aperture through which the threaded rod may be removably attached at an opposite end to the bracket by a positioning jam nut on each surface of the bracket support member, and further comprising means for providing fluid flow from the skimming sleeve body member which are also a means for orienting the skimming sleeve body member with respect to the surface of the fluid body, comprising means for providing fluid flow from the skimming sleeve body member are also a means for orienting the skimming sleeve body member with respect to the surface of the fluid body sleeve guide member, where the sleeve guide member is cylindrical in shape and comprises an inlet, an outlet, a fluid flow passageway in open communication with the inlet and the outlet, and an outside diameter which is less than an inside diameter of the skimming sleeve body member, and where the sleeve guide member inlet is slidably positioned within the fluid flow passageway of the skimming sleeve body member and vertically positioned within the fluid body, and where the sleeve guide member further comprises means for connecting the sleeve guide member to a suction pump.

23. A suction skimmer according to claim 1, wherein the skimming sleeve body member comprises a restraining means to limit the vertical movement of the skimming sleeve body member to a maximum distance equal to a length of the skimming sleeve body member.

24. A suction skimmer according to claim 1, wherein the open upper end of the skimming sleeve body member is adjusted to a distance below the surface of the fluid body, so that the open upper end acts as an inlet for fluid at the distance below the surface of the fluid body.

25. A suction skimmer according to claim 1, wherein the open upper end of the skimming sleeve body member is adjusted to a distance above the surface of the fluid body, so that the open lower end acts as an inlet for fluid below the surface of the fluid body.

26. A fluid processing system for selectively processing an upper layer of fluid from a fluid body, comprising in series a suction skimmer according to claim 1 for withdrawing the upper layer of the fluid and a suction pump connected to the suction skimmer.

27. A fluid processing system for selectively withdrawing and purifying an upper layer of fluid from a fluid body in a vessel, comprising in series a suction skimmer according to claim 1 for withdrawing the upper layer of the fluid, a suction pump connected to the suction skimmer by a first conduit, a purification system connected to the pump by a second conduit through which the withdrawn fluid is delivered to the purification system and connected to the vessel by a third conduit through which purified fluid is returned to the fluid body in the vessel.

28. A method of purifying a contaminated fluid body contained within a vessel, comprising:

a) providing a fluid processing system according to claim 27;

b) actuating the pump such that an upper layer of the fluid is withdrawn from the vessel via the suction skimmer and pumped to the purification system;

c) purifying the fluid in the purification system; and d) returning the purified fluid from the purification system into the vessel.

* * * * *